(12) United States Patent
Shin et al.

(10) Patent No.: US 8,486,354 B2
(45) Date of Patent: Jul. 16, 2013

(54) METHOD FOR EXTRACTING RARE EARTH MATERIAL FROM MONAZITE

(75) Inventors: Hee-Young Shin, Daejeon (KR); Whan-Tae Kim, Daejeon (KR); In-Kook Bae, Daejeon (KR); Soo-Chun Chae, Seoul (KR)

(73) Assignee: Korea Institute of Geoscience and Mineral Resources (KIGAM), Daejeon (KR)

( * ) Notice: Subject to any disclaimer, the term of this patent is extended or adjusted under 35 U.S.C. 154(b) by 0 days.

(21) Appl. No.: 13/504,192

(22) PCT Filed: Nov. 26, 2009

(86) PCT No.: PCT/KR2009/006999
§ 371 (c)(1),
(2), (4) Date: May 14, 2012

(87) PCT Pub. No.: WO2011/065602
PCT Pub. Date: Jun. 3, 2011

(65) Prior Publication Data
US 2012/0219477 A1 Aug. 30, 2012

(30) Foreign Application Priority Data
Nov. 25, 2009 (KR) .................. 10-2009-0114710

(51) Int. Cl.
*C22B 59/00* (2006.01)
(52) U.S. Cl.
USPC ........... 423/21.1; 423/263; 423/305; 423/312

(58) Field of Classification Search
USPC ................. 423/21.1, 263, 305, 312
See application file for complete search history.

(56) References Cited

U.S. PATENT DOCUMENTS

| | | | | |
|---|---|---|---|---|
| 2,776,877 A | * | 1/1957 | Cardon | 422/208 |
| 2,811,411 A | * | 10/1957 | Calkins | 423/11 |
| 2,815,264 A | * | 12/1957 | Calkins et al. | 423/10 |
| 4,394,353 A | * | 7/1983 | Miyake et al. | 423/21.5 |
| 4,976,938 A | * | 12/1990 | Knize et al. | 423/249 |

FOREIGN PATENT DOCUMENTS

| | | |
|---|---|---|
| JP | 56-087638 A | 7/1981 |
| JP | 58-171539 A | 10/1983 |
| JP | 61-238930 A | 10/1986 |
| JP | 62-060833 * | 3/1987 |
| JP | 62-060834 A | 3/1987 |

OTHER PUBLICATIONS

International Search Report: mailed Jan. 10, 2011; PCT/KR2009/006999.

* cited by examiner

*Primary Examiner* — Steven Bos
(74) *Attorney, Agent, or Firm* — Ladas & Parry LLP

(57) ABSTRACT

A method for extracting rare earth elements from monazite is disclosed. The method includes milling a mixture of monazite including phosphates and rare earth elements and sodium hydroxides inside a mill containing a plurality of balls to form powder by colliding the mixture into balls with each other, converting the mixture into rare earth hydroxides and sodium phosphates through the reaction occurring in the process of repeated collision, and extracting rare earth elements from the powder.

11 Claims, 9 Drawing Sheets

| Ce | La | Nd | Pr | Sm | Gd | Y | P |
|----|----|----|----|----|----|----|----|
| 20.5 | 8.5 | 6.9 | 1.4 | 0.7 | 1.5 | 0.8 | 11.4 |

FIG. 6
(a)
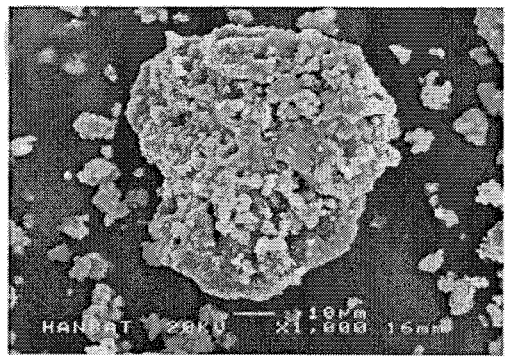
(b)
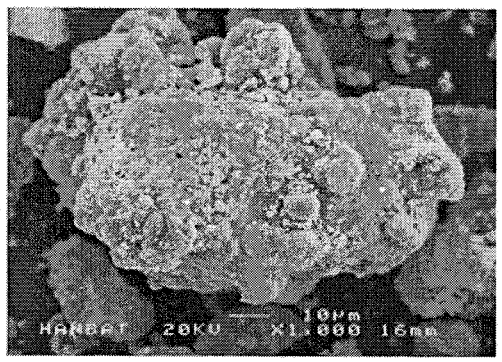
(c)
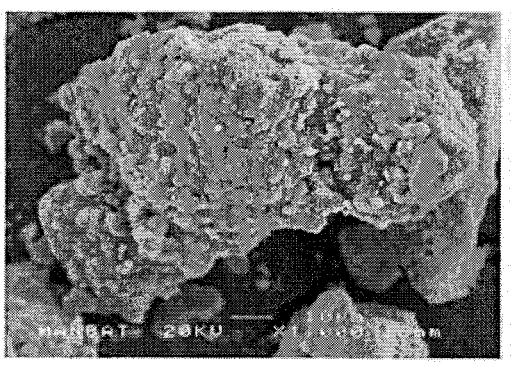
(d)
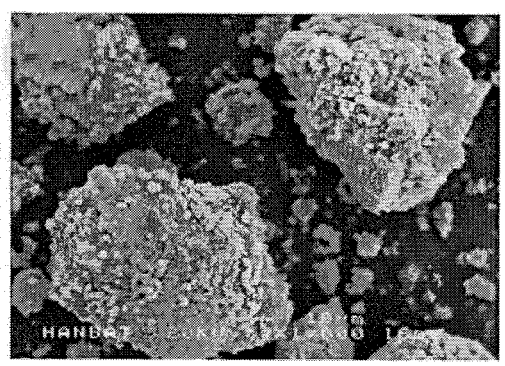
(e)
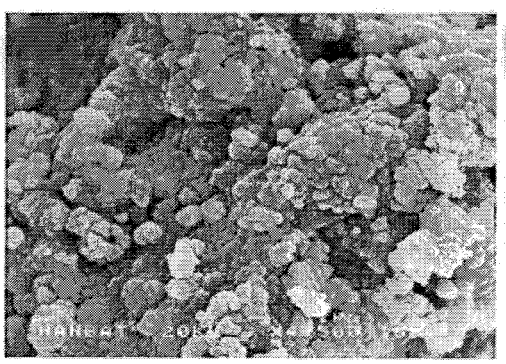
(f)
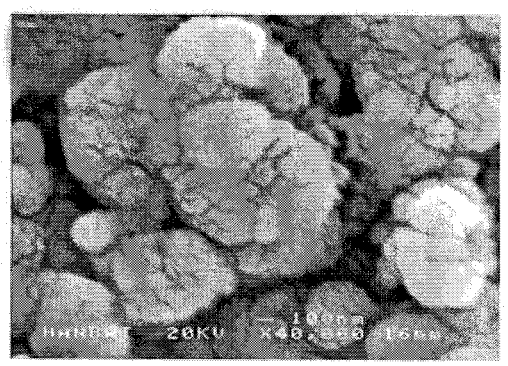

METHOD FOR EXTRACTING RARE EARTH MATERIAL FROM MONAZITE

CROSS-REFERENCE TO RELATED APPLICATIONS

This application claims priority under 35 U.S.C. §119 to Korean Patent Application No. 10-2009-0114710, filed on Nov. 25, 2009, in the Korean Intellectual Property Office, the entire contents of which are incorporated herein by reference.

BACKGROUND

Example embodiments of inventive concepts relates to a method for extracting valuable elements from minerals, and more particularly, to a method for extracting rare earth elements from monazite included in the sea sand.

The rare earth element is a generic term of seventeen chemical elements including fifteen lanthanides whose atomic numbers are from 57 through 71 plus scandium and yttrium of the third group in the periodic table. There exist scare rare earth elements in the natural world, but demands for the rare earth elements as materials in high-tech industries such as electric, electronic, catalyst, optics, special metals, super conductors, and fluorescent substance has been rapidly increasing.

Meanwhile, the world concentrates on securing rare earth elements because not only producers such as China restricts exports strategically, but also the price of rare earth elements has been rising along with the recent price increase of raw materials.

Recently, methods for extracting rare earth elements from sea sand, especially, from monazite and bastnasite, has been tried to secure rare earth elements.

Monazite ($RePO_4$, Re denotes rare earth elements) is a phosphate mineral in which rare earth elements and phosphates are combined, and main rare earth elements are cerium (Ce), lanthanum (La), and neodymium (Nd) with a small amount of praseodymium (Pr), gadolinium (Gd), and samarium (Sm). Also, uranium (U) and thorium (Th) may be obtained in the process of extracting from monazite or processing monazite as byproducts.

Economical methods among methods for extracting rare earth elements from monazite are acid leaching extracting rare earth elements by soaking monazite in sulfuric acid or hydrochloric acid, alkaline leaching extracting rare earth elements by soaking monazite in sodium hydroxide, and sintering in a high temperature along with sodium hydroxide or sodium phosphate.

However, such the methods have problems that elaborate adjustment for high temperature, pressure, and pH is required and it is not easy to extract rare earth elements. Especially, extracting rare earth elements at a high temperature, continuous producing of chemicals to adjust pH, and post-cleaning of the used chemicals expose problems.

SUMMARY

The inventive concept provides a method for extracting rare earth elements from monazite that makes it easier to extract rare earth elements from monazite in the condition of high temperature and high pressure.

The method includes milling a mixture of monazite including phosphates and rare earth elements and sodium hydroxides into powder with a use of a mill containing a plurality of balls by crushing the mixture into balls inside the mill and converting the mixture into rare earth hydroxides and sodium phosphates through the mechano-chemical effect caused by the repeated collision, and extracting the rare earth elements from the powder.

The method further includes washing the powder generated in the process of the milling and converting with water such that sodium phosphates may be removed from the powder.

The sodium hydroxide may be in a solid state.

BRIEF DESCRIPTION OF THE DRAWINGS

Exemplary embodiments of the inventive concept will be more clearly understood from the following detailed description taken in conjunction with the accompanying drawings in which:

FIG. 6 is a after milling for 15 minutes a, 30 minutes b, 60 minutes c, 120 minutes d, and enlarged SEM photo of d;

DETAILED DESCRIPTION OF THE EMBODIMENTS

Figure 1:
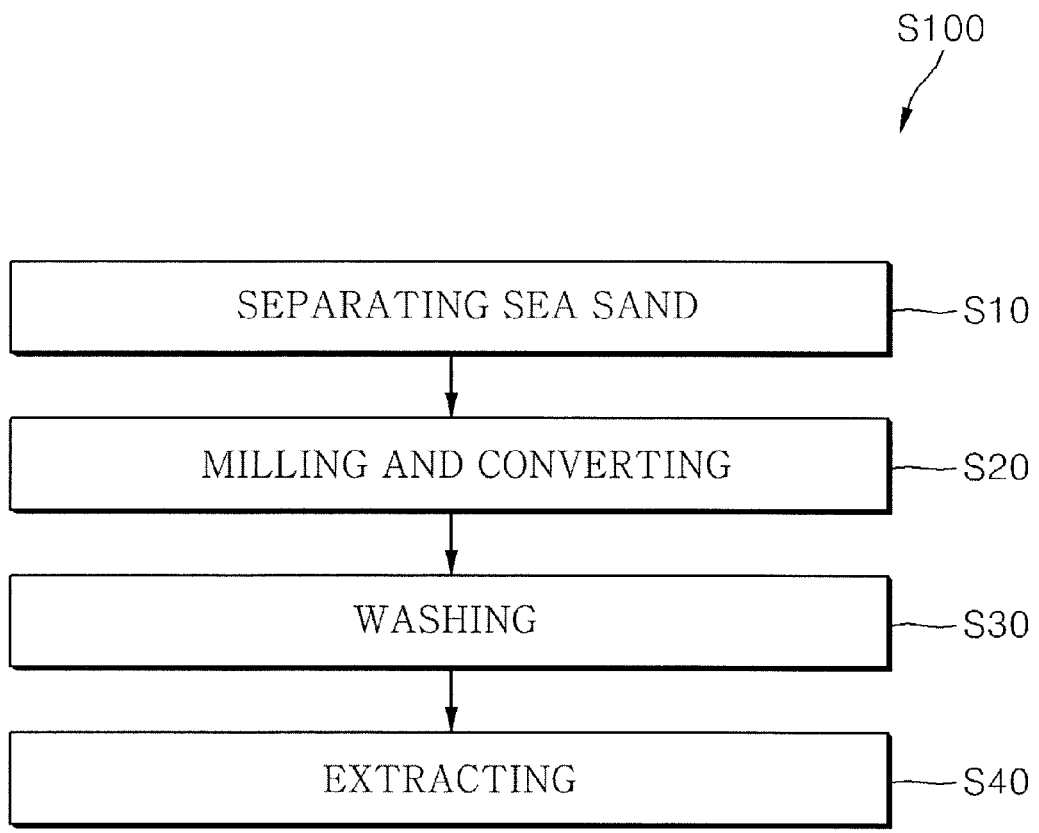
FIG. 1 is a schematic flow chart of a method for extracting rare earth elements in monazite according to an exemplary embodiment of the inventive concept.

Various example embodiments will be described more fully hereinafter with reference to the accompanying drawings, in which some example embodiments are shown. Inventive concepts may, however, be embodied in many different forms and should not be construed as limited to the example embodiments set forth herein. Rather, example embodiments are provided so that this disclosure will be thorough and complete, and will fully convey the scope of inventive concepts to those skilled in the art. In the drawings, the sizes and relative sizes of layers and regions may be exaggerated for clarity. Like numerals refer to like elements throughout.

The terminology used herein is for the purpose of describing particular example embodiments only and is not intended to be limiting of the inventive concepts. As used herein, the singular forms "a," "an" and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which inventive concepts belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a schematic flow chart of a method for extracting rare earth elements included in monazite according to an exemplary embodiment of the inventive concept. Referring to FIG. 1, the method for extracting rare earth elements included in monazite S100 includes separating sea sand S10, milling and converting S20, washing S30, and extracting S40.

The separating sea sand S10 is for separating monazite from sea sand. The method for extracting rare earth elements included in monazite according to the inventive concept is conducted on monazite separated from sea sand, but the embodiment is not restricted thereto, thus monazite separated from minerals other than sea sand may be the object. The monazite in the exemplary embodiment of the inventive concept is separated from sea sand, thus, the separating sea sand S10 is performed.

The separating sea sand S10 is separating monazite from sea sand. Methods such as gravity concentration, electrostatic separation, and magnetic separation are used, when separating monazite from sea sand.

The gravity concentration is using a difference of specific gravity of each mineral. To separate particles having a different gravity, it is necessary to maintain the status that particles may move in a certain degree. Accordingly, a wet process giving mobility using water, a dry process giving mobility using air, or a mixed process, and a spiral gravity sorter (not shown) is used in an exemplary embodiment. The spiral gravity sorter performs separation according to the gravity of minerals by using a principle that sea sand of a high gravity gathers inside the spiral path and sea sand of a low gravity gathers outside the spiral path due to a centrifugal force, when sea sand is proceeded from the upper portion of the spiral path to the lower portion of the spiral path. Monazite has a relatively high gravity, thereby included in the sea sand gathering inside the spiral path.

After separating the sea sand of a high gravity through gravity concentration, electrostatic separation and magnetic separation are performed.

Electrostatic separation is separating mineral particles by using electric properties, such as conductivity and ferroelectricity. First, electric charges are put on the particles along the certain direction, selectively, and the separation is performed by using an electrostatic force applied to the particles in the electrostatic field between electrodes formed by applying a high voltage.

Magnetic separation is a method for separation by using a susceptibility difference of minerals. All the substances may be divided into paramagnetic substances, diamagnetic substances, and ferromagnetic substances according to magnetism. That is, monazite may be separated from sea sand by using magnetism.

After separating monazite from sea sand by using the above methods, the process for extracting rare earth elements from the monazite is performed.

The milling and converting S20 includes putting the monazite and sodium hydroxides together into a mill. The mill is a conventional planetary ball mill, which is made of zirconia and contains a plurality of balls. The balls are also made of zirconia. Zirconia has a hardness of 8.5 on the Moh's scale, which is very hard.

The planetary ball mill rotates while containing the monazite and the sodium hydroxides along with the balls. With the rotation of the planetary ball mill, the balls collide with each other continuously, and the monazite and the sodium hydroxides interposed between the balls are crushed. Then, the monazite and the sodium hydroxide are converted into rare earth hydroxides and sodium phosphates through reaction caused by constant collision. A chemical formula thereof is as followings.

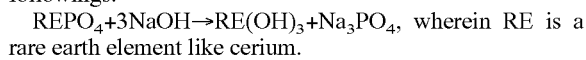

$REPO_4 + 3NaOH \rightarrow RE(OH)_3 + Na_3PO_4$, wherein RE is a rare earth element like cerium.

The mechano-chemical effect denotes a change of physical and chemical characteristic of a particle due to physical milling energy, especially, in the case of a solid, a series of chemical phenomenon causing a chemical change such as reaction to surrounding substances. The mechanical energy applied for milling is cost on making the diameter size of the particle smaller and destroying a crystal structure of the particle such that crystal lattice disturbance, formlessness, and the like, may be occurred, thereby increasing particle vitality such as solubility and sintering.

According to an exemplary embodiment, sufficient mechanical energy (heat up to 1400 degrees is generated momentarily) is assigned to the monazite and the sodium hydroxides between the balls, accordingly, the monazite and the sodium hydroxides react mutually and convert. The mutual reaction between the monazite and the sodium hydroxides in the ball mill and the conversion into rare earth hydroxides and sodium phosphates may be the mechano-chemical effect in the view of being assigned energy while being crushed.

It is noteworthy that the process of producing rare earth hydroxide from monazite and sodium hydroxides is performed at a normal temperature and normal pressure according the exemplary embodiment, whereas a conventional method for extracting monazite requires a high temperature and high pressure as well as elaborate adjustment with respect to temperature, pressure, and pH.

Figures 2, 3:
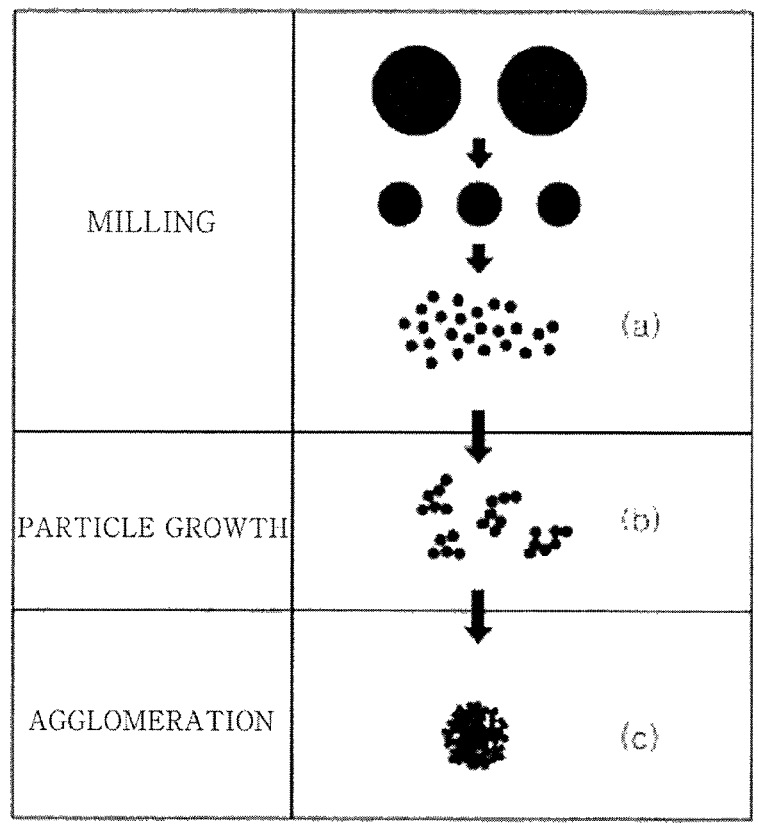
FIG. 2 is a schematic diagram for explaining the mechano-chemical effect.
FIG. 3 is a table showing a chemical composition of the monazite used for a test for extracting rare earth elements according to an exemplary embodiment of the inventive concept.

The mechano-chemical effect will be described in detail referring to FIG. 2. Referring to FIG. 2, the mechano-chemical effect is divided into largely three steps. First step is a milling process that large particles contact and collide with balls so that the diameter of the particle gets smaller. The second step is particle growth that the particles re-agglomerate so that the diameter of the particle even gets greater, and the third step is agglomeration that the particles agglomerate physicochemically completely to form larger assembled particles.

The second process is referred to as the particle growth, because the particles agglomerate relatively weekly due to gravity and fractional heat, and the diameter of the particles increase due to agglomeration of the particles. If the particles agglomerate physicochemically, specific surface area is to be reduced along with the growth of particle diameter, but the specific surface area in the particle growth even increases.

That is, this phenomenon is shown when the particles are assembled merely and there exists many gaps among the particles, which means the agglomeration of particles in the second step is not physiochemical agglomeration. That is, the phenomenon can be referred to as simple cluster of minute particles.

However, the particles vitalized by milling during the above two processes agglomerate physicochemically to form a large assembly in the agglomeration process of the third step. That is, the diameter of the particle increases and the specific surface area reduces at the same time such that different particles from those in the previous process are formed.

According to an exemplary embodiment, the monazite and the sodium hydroxides are minutely grinded while being collided between balls and converts into rare earth hydroxides and sodium phosphates through physicochemical change.

When the milling and converting S20 is finished, the extracting S40 extracting rare earth elements from the rare earth hydroxide is to be performed, but, the washing S30 is performed before the extracting S40 in an exemplary embodiment.

The washing S30 includes washing the particles undergone the milling and converting S20 with distilled water. The sodium phosphate among the particles undergone the milling and converting S20 is water soluble, whereas the rare earth hydroxide is not water soluble, accordingly, the sodium phosphate and the rare earth hydroxide may be separated through the washing S30. But, the washing S30 is not an essential step, and the extracting S40 may be performed without the washing S30 in some embodiments.

The extracting S40 extracting rare earth elements from the rare earth hydroxide is performed after the washing S30. There are various conventional methods for extracting a rare earth element by separating hydroxy group ($OH^-$) from a rare earth hydroxide. For example, a rare earth element may be collected selectively through solvent extraction, or the like, after melting the solid rare earth hydroxide in sulfuric acid solution. Such the method is a conventional method for separating a hydroxide, so the detailed description thereof is omitted herewith.

As described above, the method for extracting rare earth elements from monazite according to an exemplary embodiment of the inventive concept includes separating monazite from sea sand by means of gravity concentration, electrostatic separation, and the like, milling and converting causing the mechano-chemical effect to form rare earth hydroxides and sodium phosphates, washing to eliminate the sodium phosphates, and extracting rare earth elements from the rare earth hydroxides.

The most important feature of the inventive concept is to convert monazite and sodium hydroxides into rare earth hydroxides and sodium phosphates through the mechano-chemical effect caused by milling in a ball mill at a normal temperature and pressure.

A test for confirming a smooth conversion from monazite and sodium hydroxides into rare earth hydroxides and sodium phosphates through the mechano-chemical effect.

The sea sand used for the test was taken from Malaysia beach, which is high in monazite, and the size of the particle is restricted as 212 μm or less. The chemical composition of the monazite is as a table of FIG. 3. Referring to the table, various rare earth elements including neodymium (Nd) are included. Sodium hydroxides and sulfuric acid solution was purchased from Wako Pure Chemicals Corporation.

First of all, the monazite and the sodium hydroxide are mixed at 1:1.67 weight ratio to make a monazite-sodium hydroxide mixture of 4 g. After then, the mixture is put into a ball mill of 50 cc (product name: Fritsch Pulverisset-7) which is made of zirconia and grinded. The ball mill contains seven balls of 15 mm in diameter also made of zirconia. The ball mill is rotated at a certain speed and mills the mixture while adjusting milling time in various ways from 15 minutes to 240 minutes to form powder.

After milling for the fixed time is finished, washing with distilled water is performed while vibrating the powder for 30 minutes to remove the sodium phosphate from the powder, and powder (rare earth hydroxide) which is not water soluble is filtered out and dried in the oven at 80° C. for 24 hours. And then, rare earth elements are collected from the dried powder with sulfuric acid solution of 0.05-5N concentration through acid leaching.

To confirm the rare earth hydroxides and the sodium phosphates are formed properly from the monazite and the sodium hydroxides during the milling and converting step, a pattern analysis using an X-ray diffraction apparatus (product name: RAD-B system of Rigaku Corporation) checking an X-ray by Cu-Ka with respect to the powder undergone the milling and the washing was performed, and the powder was examined through SEM. Also, a differential thermal analysis was performed through a differential thermal analyzer (product name: TG-DTA, TAS-2000 of Rigaku Corporation). Lastly, the leftover sand after the acid leaching was filtered and examined through a spectrophotometer (product name: ICP-AES, JY38 of Jobinyvon Corporation).

Analysis tables with respect to the test are shown in FIGS. 4 through 10.

Figure 4:
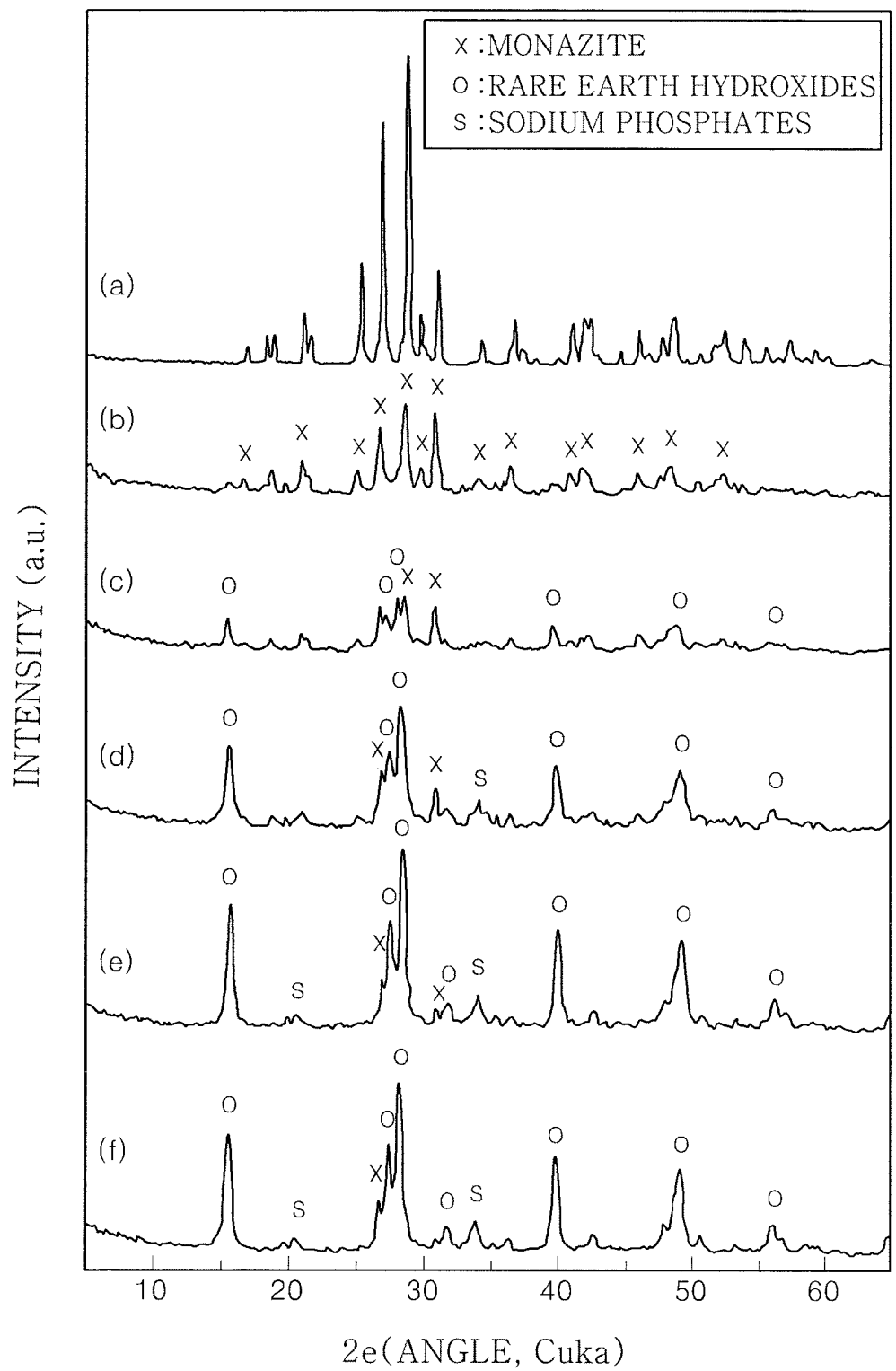
FIG. 4 is a table analyzing X-ray diffraction peaks of a mixture powder of monazite and sodium hydroxides according to milling time, and a is an analysis table of X-ray diffraction peaks of pure monazite, b is an analysis table of X-ray diffraction peaks of the powder after 15 minutes milling, c is an analysis table of X ray diffraction peaks of the powder after 30 minutes milling, d is an analysis table of X ray diffraction peaks of the powder after 60 minutes milling, e is an analysis table of X ray diffraction peaks of the powder after 120 minutes milling, and f is an analysis table of X ray diffraction peaks of the powder after 240 minutes milling.

FIG. 4 is an analysis table analyzing X-ray diffraction peaks according to milling time of the mixture of monazite and sodium hydroxides, a is an x-ray diffraction peak analysis of pure monazite, b is an x-ray diffraction peak analysis of the powder after 15 minutes milling, c is an x-ray diffraction peak analysis of the powder after 30 minutes milling, d is an x-ray diffraction peak analysis of the powder after 60 minutes milling, e is an x-ray diffraction peak analysis of the powder after 120 minutes milling, and f is an x-ray diffraction peak analysis of the powder after 240 minutes milling.

Referring to the table of FIG. 4, a feature of monazite is disappearing as milling time increases from a to f, and diffraction patterns of rare earth hydroxides and sodium phosphates shows in e stage when 120 minutes has passed, and it can be confirmed that monazite and sodium hydroxides are converted into rare earth hydroxides and sodium phosphates through the mechano-chemical effect when milling is performed during a certain time or more.

Figure 5:
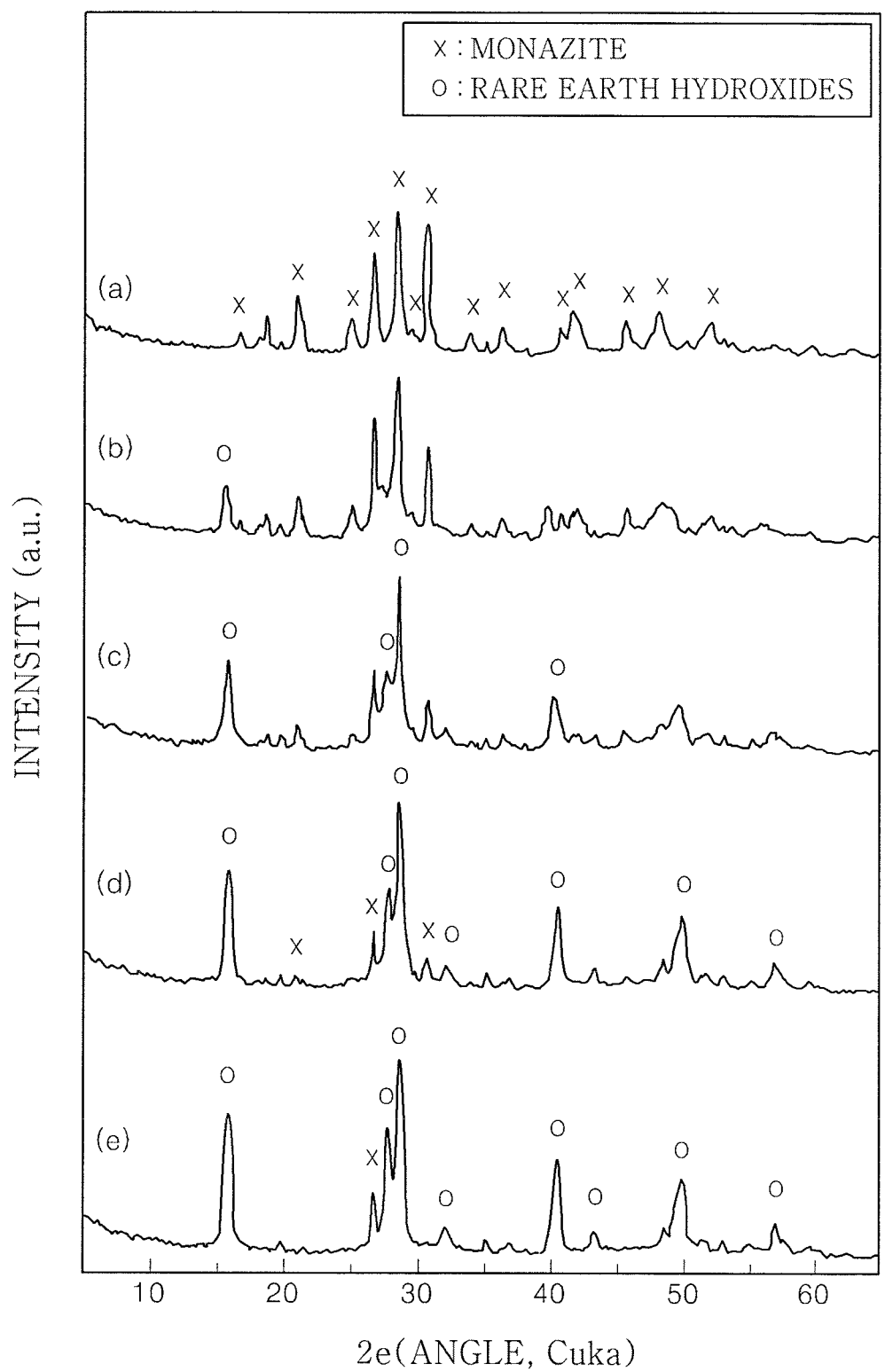
FIG. 5 is a table showing X ray diffraction peaks of the powder washed with distilled water after milling for 15 minutes a, 30 minutes b, 60 minutes c, 120 minutes d, and 240 minutes e.

FIG. 5 is an analysis table of X-ray diffraction peak with respect to the powder washed with distilled water after 15 minutes milling a, 30 minutes milling b, 60 minutes milling c, 120 minutes milling d, and 240 minutes milling e. Referring to the table of FIG. 5, a diffraction pattern of sodium phosphate is not showing in the powder washed with distilled water after milling, thus, it can be confirmed that sodium phosphates are melted in distilled water and eliminated from the powder.

And, FIG. 6 are SEM photographs of the powder after milling of each different time, 15 minutes, 30 minutes, 60 minutes, and 120 minutes.

Small particles are shown in the status a of after 15 minutes milling, and small particles agglomerate to form a relatively large particle in the status b and c of after 30 minutes and 60 minutes milling. It is noteworthy that the large particle shown in the status c of after 60 minutes milling is grinded into a small particle composed of minute particles of the size 0.1~1 μm again as shown in status e (10 times enlarged photograph of photograph d). Also, the large particle forms an assembly even though it has many cracks as shown in photograph f (10 times enlarged photograph of photograph e).

Figure 7:
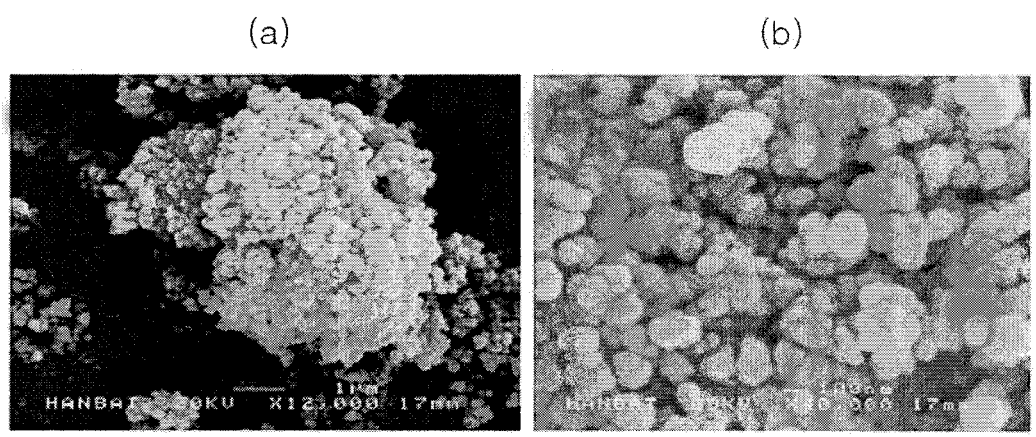
FIG. 7 is a SEM photo of the powder after milling for 120 minutes and washing the powder.

Referring to photograph a of FIG. 7, the washed powder after 120 minutes milling includes small particles of the size 0.05~0.2 μm, and the powder particle forms an assembly as like e and f photographs of FIG. 6 even though it has cracks on its surface shown in b photograph (enlarged photograph of a) of FIG. 7.

That is, referring to the X-ray diffraction analysis and the SEM photographs, it can be shown that the grinded particles agglomerate physicochemically to form a large assembly after 120 minutes milling, and it is confirmed that the assembly is a rare earth hydroxide and a sodium phosphate with the result of the X-ray diffraction analysis.

Figure 8:
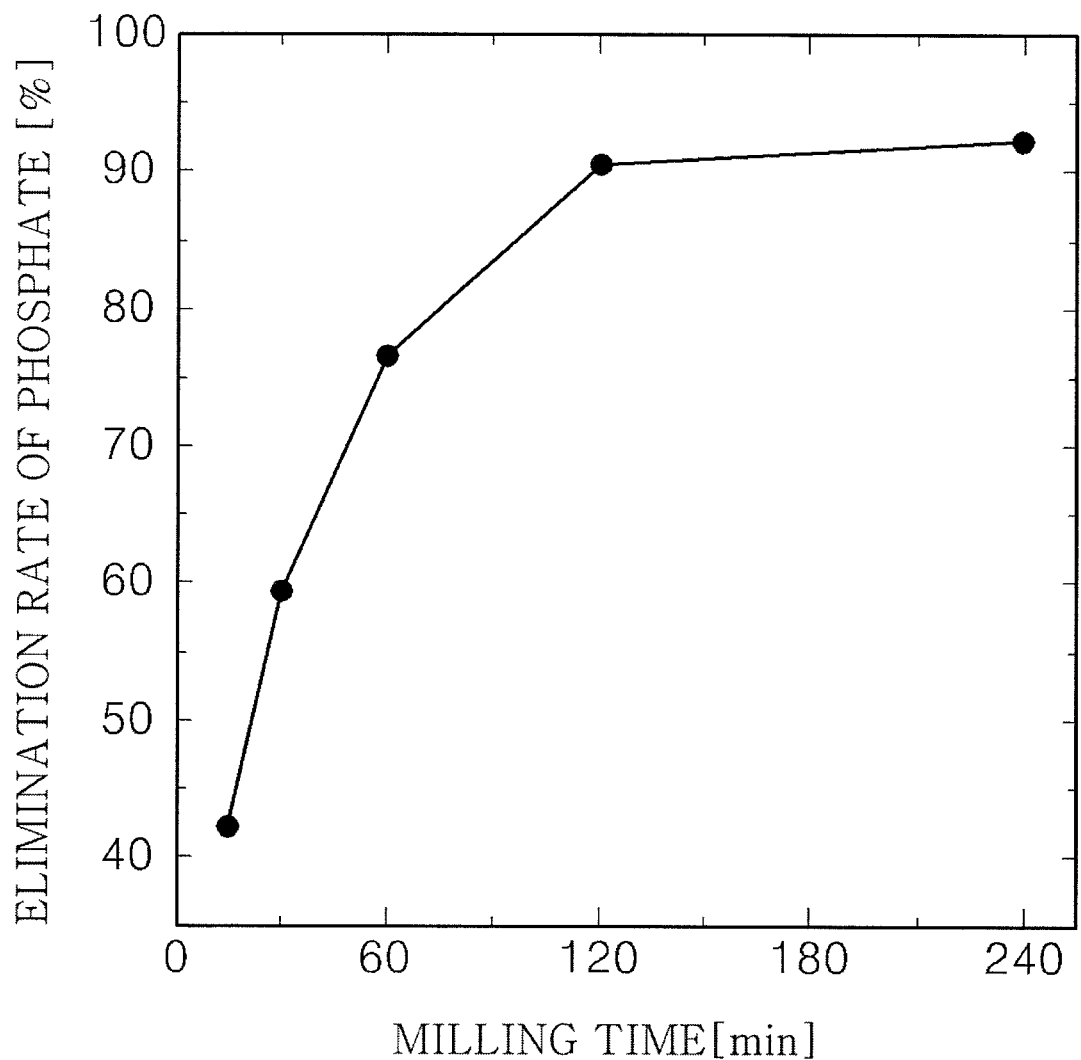
FIG. 8 is a graph showing the rate of phosphate elimination from the powder according to milling time.

FIG. 8 is a graph illustrating the elimination rate of phosphate from monazite according to milling time. Referring to FIG. 8, it can be shown that a phosphate in monazite is converted into a form of sodium phosphate as milling time passes, and especially, more than 90% of phosphates in monazite are eliminated. The eliminated phosphates are converted into a form of sodium phosphate.

With the above results, it can be shown that almost of the monazite is converted into rare earth hydroxides and sodium phosphates through the mechano-chemical effect after 120 minutes milling under the milling condition of the test.

According to an exemplary embodiment of the inventive concept, milling time is preferred to be maintained for 100 minutes through 140 minutes, preferably 120 minutes. If milling time is maintained for less than 100 minutes, a conversion rate of monazite is low, which is not preferable, and if milling time is maintained for more than 140 minutes, a conversion rate may not increase highly compared to energy infusion, which is not economical.

Figure 9:
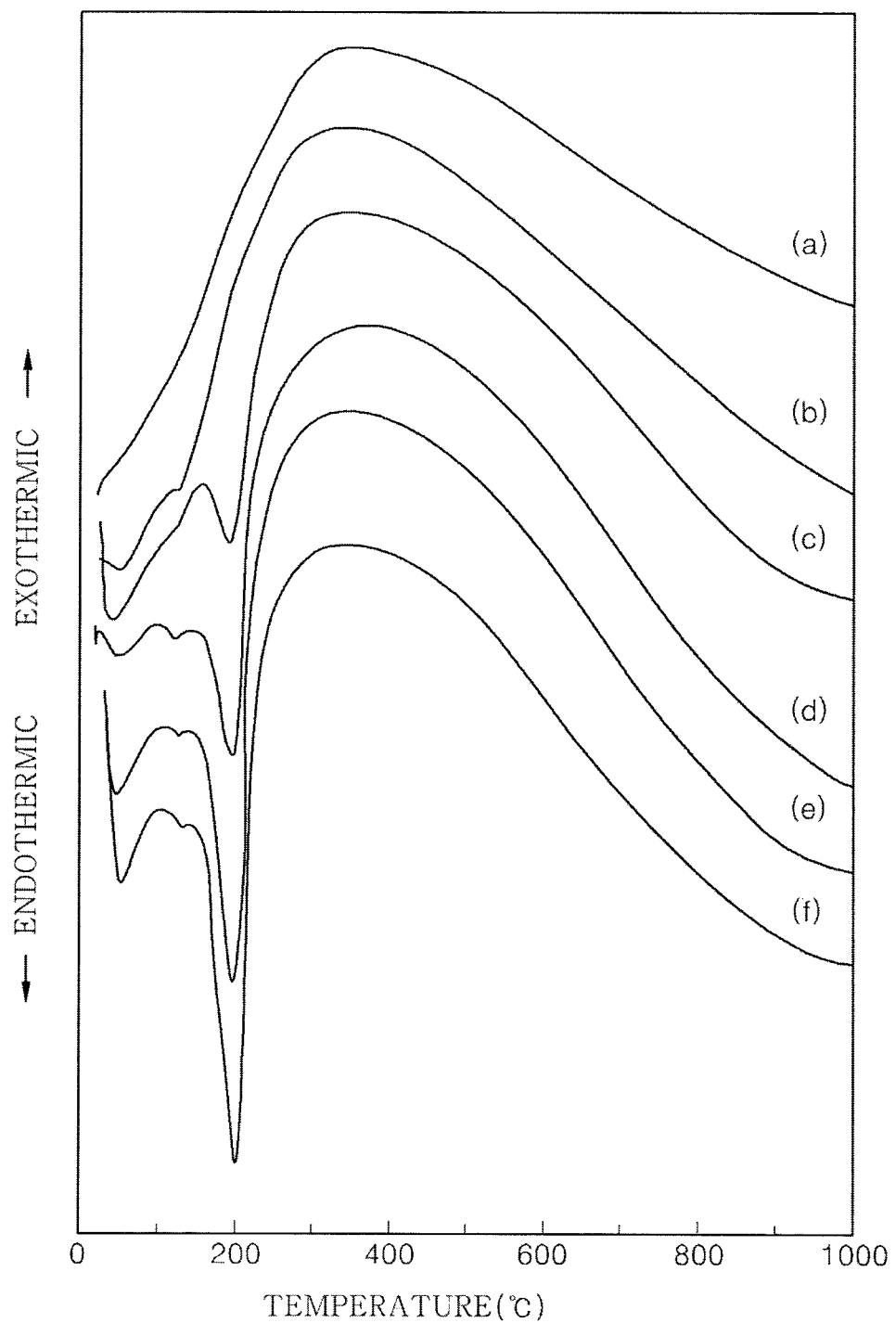
FIG. 9 is a graph showing a differential thermal analysis under the condition of a through f of FIG. 3.

FIG. 9 is a graph illustrating a differential thermal analysis in the status a through f of FIG. 3. There may not occur a special thermal phenomenon in the status of pure monazite (a of FIG. 9), but the differential thermal analysis curve after 30 minutes milling shows meaningful endothermic peaks in 60° C. and 200° C., and a peak of 200° C. increases as milling time passes. The value of a peak of 60° C. may not increase as milling time passes, which is assumed to result from dehydration of the whole powder, and the value of a peak of 200° C. increases as milling time passes, which is assumed to result from dehydration of rare earth hydroxides.

Figure 10:
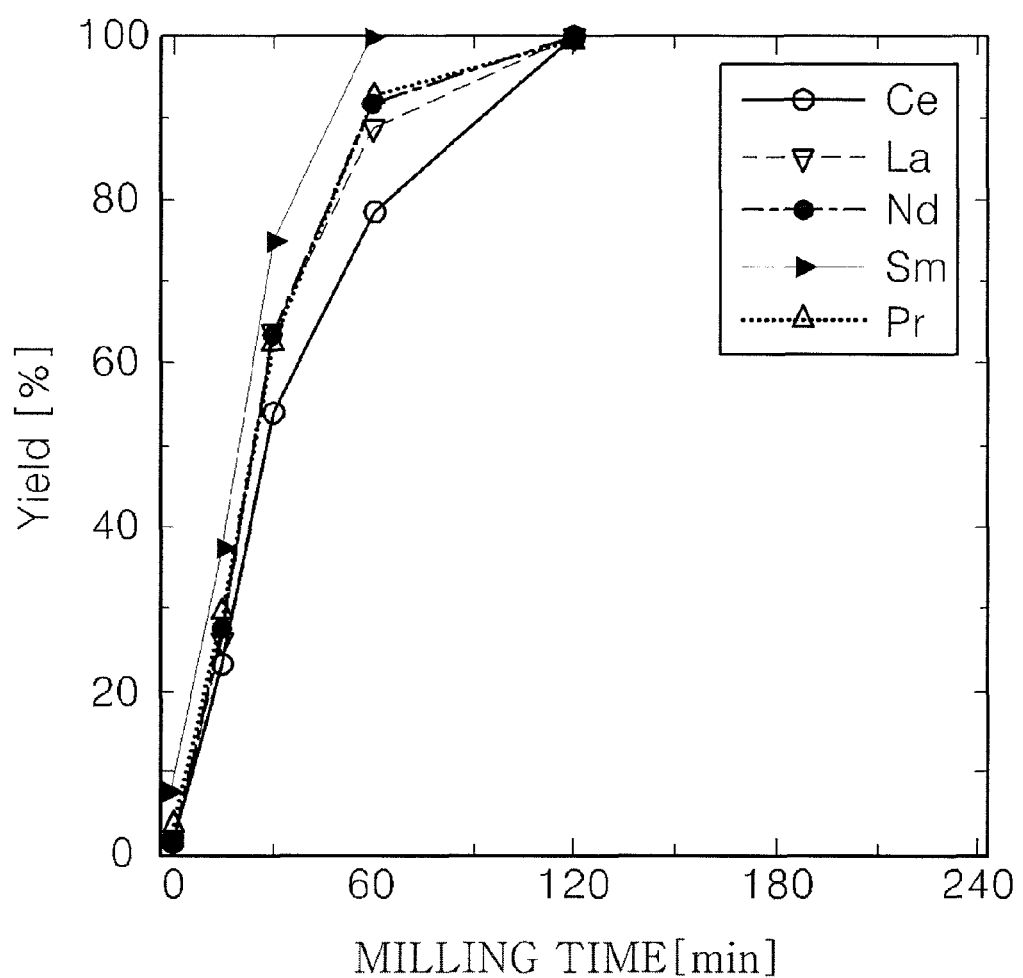
FIG. 10 is a graph showing the rate of rare earth element extraction in a sulfuric acid solution according to milling time.

Acid leaching for the powder 1 g collected after milling and washing was performed by adding sulfuric acid solution 200 mm of 0.05-5N concentration while shaking for 60 minutes at a normal temperature. FIG. 10 is the result of examining the leftover sand after the acid leaching through a spectrophotometer.

Referring to FIG. 10, the rate of rare earth element extraction increases drastically as milling time increases. Only cerium shows a low rate of rare earth element extraction compared to other elements, which is related to the stability of cerium hydroxide $Ce(OH)_3$. That is, even though the cerium hydroxide is generated during milling process, the cerium hydroxide converts into a cerium oxide when combined with oxygen because the cerium hydroxide is chemically unstable. The cerium oxide reduces the extraction rate because the soluble percentage with regards to sulfuric acid solution falls. However, in case of cerium, it is possible to improve the extraction ratio drastically when the concentration of sulfuric acid solution is bit increased.

In addition, as shown in FIG. 10, all kinds of rare earth elements including cerium are extracted completely after 120 minutes milling, and it is confirmed that rare earth elements are extracted from monazite by using the ball mill effectively.

Also, such the process is performed at a normal temperature and normal pressure and may not require elaborate adjustment about temperature, pressure and pH, which is very simple and economical.

The method for extracting rare earth elements from monazite according to an exemplary embodiment of the inventive concept has an effect of enabling to extract rare earth elements easily by converting the rare earth elements in monazite into rare earth hydroxides easily by means of generating the mechano-chemical effect while crushing monazite in the planetary mill.

Also, the method is performed at a normal temperature and normal pressure, which is very simple and economical.

While the present invention has been particularly shown and described with reference to exemplary embodiments thereof, it will be understood that various changes in form and details may be made therein without departing from the spirit and scope of the following claims.

What is claimed is:

1. A method for extracting rare earth elements in monazite comprising:
    separating the monazite from sand, wherein separating is achieved by physical separation methods selected from the group consisting of gravity concentration, electrostatic separation, and magnetic separation;
    milling a mixture of the monazite and sodium hydroxide in a mill to convert the mixture into a powder that comprise rare earth hydroxides and sodium phosphates;
    solubilizing the sodium phosphates into water and allowing the rare earth hydroxides to remain as a water insoluble components in the powder;
    filtering the powder;
    drying the powder; and
    extracting the rare earth element from the powder with sulfuric acid to leach the rare earth elements from the powder.

2. The method of claim 1, wherein the chemically separating the sodium phosphates away from the rare earth hydroxides in the milled particles eliminates more than 90% of phosphates in the monazite.

3. The method of claim 1, wherein the sand comprises sea sand.

4. The method of claim 1, wherein the milling is continuously maintained for 100 minutes through 140 minutes.

5. The method of claim 1, wherein the water is distilled water.

6. The method of claim 1, wherein the physical separation method comprises gravity concentration.

7. The method of claim 1, wherein the physical separation method comprises electrostatic separation.

8. The method of claim 1, wherein the physical separation method comprises magnetic separation.

9. The method of claim 1, wherein the sulfuric acid is at a concentration between about 0.05 N and about 5 N.

10. The method of claim 1, wherein milling the mixture results in a peak temperature of between about 60° C. to about 200° C.

11. The method of claim 1, wherein the mill comprises a planetary ball mill.

* * * * *